Jan. 9, 1923.  1,441,224
G. GROSHOLZ.
WHEEL PULLER.
FILED NOV. 25, 1921.
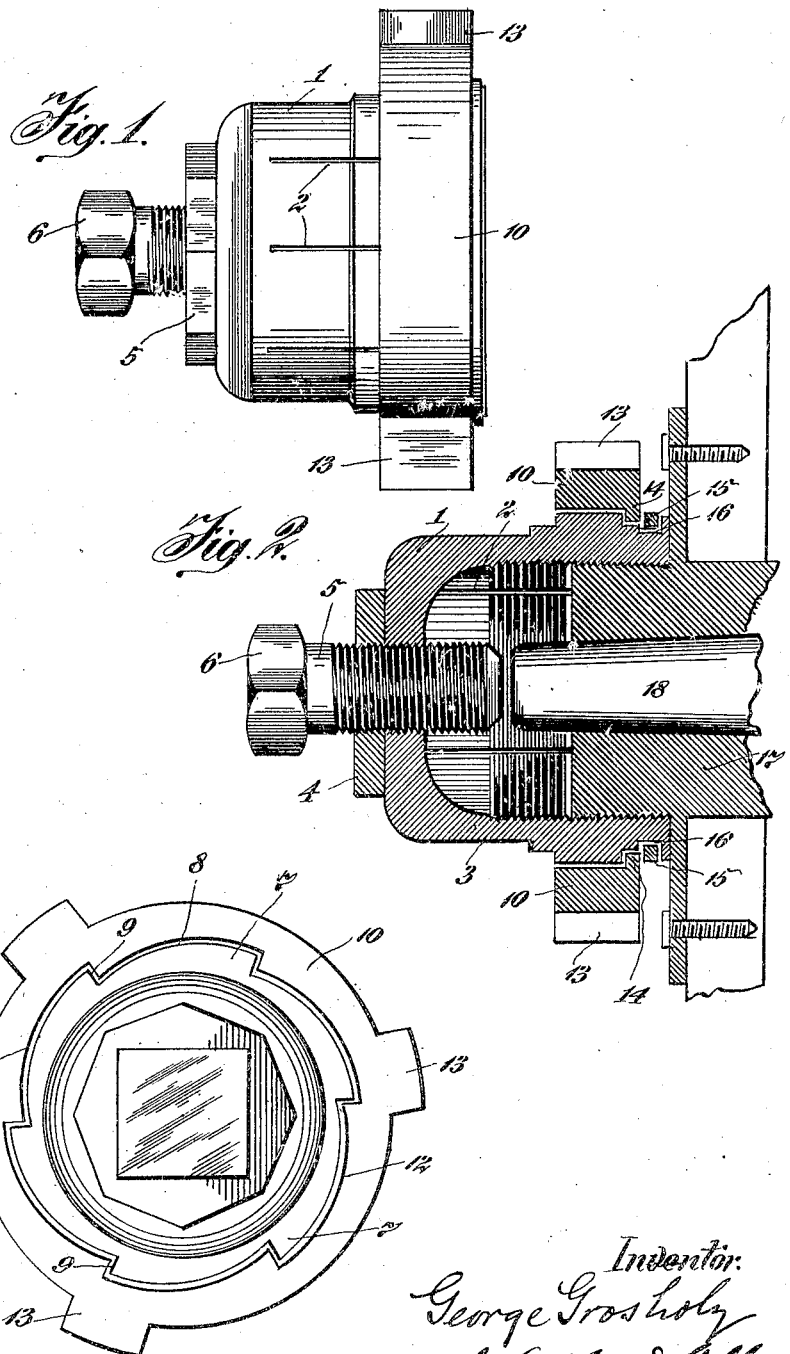

Patented Jan. 9, 1923.

1,441,224

UNITED STATES PATENT OFFICE.

GEORGE GROSHOLZ, OF DAYTON, KENTUCKY, ASSIGNOR OF ONE-HALF TO JOHN REEVES, OF CONSTANCE, KENTUCKY.

WHEEL PULLER.

Application filed November 25, 1921. Serial No. 517,496.

*To all whom it may concern:*

Be it known that I, GEORGE GROSHOLZ, a citizen of the United States, and a resident of Dayton, in the county of Campbell and State of Kentucky, have invented certain new and useful Improvements in Wheel Pullers, of which the following is a full, clear, and exact description, reference being had to the accompanying drawings, forming part of this specification.

My invention relates to devices for pulling wheels from vehicle axles in which a screw bolt mounted in a split or slotted sleeve is brought to bear on the end of the axle, with the sleeve screw threaded over the hub of the wheel and locked or clamped in place so that the pressure of the bolt draws the wheel and hub from the axle. The difficulty experienced in such constructions is that unless the sleeve is effectively locked to the hub there is great danger of stripping the threads of the sleeve and hub connection instead of withdrawing the wheel.

My object, therefore, is to provide a simple, cheap and exceedingly effective construction, in which the screw-threaded connection can be instantly locked against stripping the threads and instantly released when the wheel has been drawn from the hub.

My invention consists of that certain novel construction to be hereinafter particularly pointed out and claimed, whereby an annular clamp member is provided for clamping the sleeve in place which can be operated by the blow of a hammer or any convenient instrument to uniformly contract the split sleeve to lock it in place without the need of a wrench or any special tool, and which can be as readily released by a blow in the opposite direction.

In the drawings,

Figure 1 is a side elevation of my improved wheel puller.

Figure 2 is a central longitudinal section illustrating its application to the wheel.

Figure 3 is a front elevation.

As shown in the drawings, 1 is the cup-shaped sleeve provided with longitudinal slots 2, 2, and with interior screwthreads 3. The outer end of the sleeve is preferably formed with a head 4 to provide a sufficient effective threaded bearing surface for the screw bolt 5 screwthreaded centrally therein and provided with a head 6 for any suitable wrench.

The exterior inner end of the sleeve 1 is provided with a series of peripheral cam projections 7 of gradual slope in one direction 8, and terminating in sharp radial shoulders 9.

Mounted over these cam projections is an annular band 10 provided with corresponding cam depressions 12. Projecting outwardly the band also carries a series of striking lugs 13.

Any convenient means may be employed for holding the band in place. In the construction I have chosen for illustration, an internal flange 14 is formed in the band, which bears against the side of the cam projections of the sleeve, while a split spring ring 15 is inserted in the shallow groove 16.

The hub of the wheel 17 on the axle 18 is exteriorly screwthreaded and in order to pull the wheel from the axle the cup-shaped split sleeve is screwed on the hub. The projecting inner end of the bolt 5 is thus brought in line with the end of the axle 18. Then with a blow of a hammer or any striking instrument the user strikes the lugs 13 of the band 10 and tightens the split sleeve on the hub. The bolt is then turned and the hub pulled off of the axle. Such a powerful clamping pressure to contract the screwthreaded end of the sleeve can be obtained in this way without the need of wrench or other special tool, that there is no danger of stripping the screwthreads on the hub or sleeve when the bolt is screwed up, while a simple blow on a lug 13 in the opposite direction at once loosens the sleeve so that it can be removed from the hub.

This construction for tightening the sleeve is much more effective and less expensive than clamp collars which must be tightened from one side or tightening devices for the sleeve which do not apply the pressure on the sleeve in a plane at right angles to the sleeve axis.

In prior constructions, so far as I am aware, there is much greater liability of stripping the threads on the hub or sleeve than in my construction.

Having thus described my invention, what I claim as new and desire to secure by Letters Patent, is:—

1. A wheel puller comprising a cup-shaped split sleeve interiorly threaded, a bolt mounted in said cup-shaped end and adapted to be advanced against the end of an axle, the sleeve provided exteriorly with cam projections around the split portion of the sleeve, and a metallic band encircling said cam portion provided with corresponding interior cam depressions, with means whereby said band may be rotated to contract the split sleeve when threaded on the hub of a wheel.

2. A wheel puller comprising a cup-shaped split sleeve interiorly threaded, a bolt mounted in said cup-shaped end and adapted to be advanced against the end of an axle, the sleeve provided exteriorly with cam projections around the split portion of the sleeve, and a metallic band encircling said cam portion provided with corresponding interior cam depressions, with radially projecting lugs on said band adapted to be struck to rotate the band and contract the split sleeve when threaded on the hub of a wheel.

GEORGE GROSHOLZ.